(12) United States Patent
Zhou

(10) Patent No.: US 10,200,718 B2
(45) Date of Patent: *Feb. 5, 2019

(54) METHOD AND APPARATUS FOR A LOW COMPLEXITY TRANSFORM UNIT PARTITIONING STRUCTURE FOR HEVC

(71) Applicant: Minhua Zhou, Plano, TX (US)

(72) Inventor: Minhua Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/577,865

(22) Filed: Dec. 19, 2014

(65) Prior Publication Data

US 2015/0103908 A1    Apr. 16, 2015

Related U.S. Application Data

(63) Continuation of application No. 13/350,069, filed on Jan. 13, 2012, now Pat. No. 8,948,271.

(60) Provisional application No. 61/432,425, filed on Jan. 13, 2011.

(51) Int. Cl.
| | |
|---|---|
| *H04N 19/61* | (2014.01) |
| *H04N 19/176* | (2014.01) |
| *H04N 19/119* | (2014.01) |
| *H04N 19/157* | (2014.01) |

(52) U.S. Cl.
CPC ........... *H04N 19/61* (2014.11); *H04N 19/119* (2014.11); *H04N 19/157* (2014.11); *H04N 19/176* (2014.11)

(58) Field of Classification Search
CPC .. H04N 7/50; H04N 7/26941; H04N 21/4347; H04N 13/0239; H04N 13/0059; H04N 13/0048
See application file for complete search history.

(56) References Cited

U.S. PATENT DOCUMENTS

| | | | | |
|---|---|---|---|---|
| 2012/0106649 A1* | 5/2012 | Wang | ................... | H04N 19/159 375/240.18 |
| 2012/0128067 A1* | 5/2012 | Liu | ...................... | H04N 19/159 375/240.12 |
| 2012/0177116 A1* | 7/2012 | Panusopone | ......... | H04N 19/159 375/240.12 |
| 2013/0003855 A1* | 1/2013 | Park | ..................... | H04N 19/119 375/240.18 |
| 2013/0177079 A1* | 7/2013 | Kim | ................. | H04N 19/00569 375/240.12 |
| 2013/0315303 A1* | 11/2013 | Min | ................. | H04N 19/00763 375/240.12 |

* cited by examiner

Primary Examiner — Tsion B Owens
(74) Attorney, Agent, or Firm — Ebby Abraham; Charles A. Brill; Frank D. Cimino

(57) ABSTRACT

A method and apparatus for a low complexity transform unit partitioning structure for High Efficiency Video Coding (HEVC). The method includes determining prediction unit size of a coding unit, and setting the size of transform unit size of Y, U and V according to the prediction unit size of the coding unit.

3 Claims, 7 Drawing Sheets

RESIDUAL QUAD TREE (RQT) FOR CU → TU

INTER

ROOT CBF (ONE FLAG FOR YUV)

CU → TU PARTITIONING

CU SIZE = 16 x 16                   TU SIZE = 16 x 16 OR 8 x 8

CASE 1: PU SIZE = 16 x 16, MAXIMUM/MINIMUM TU SIZE ALLOWED = 16 x 16 / 4 x 4
  TU SIZE FOR Y   = 16 x 16,
  TU SIZE FOR U,V = 8 x 8
  1-BIT CBF USED FOR SIGNALING NON-ZERO DCT BLOCKS

CASE 2: PU SIZE ≠ 16 x 16, MAXIMUM/MINIMUM TU SIZE ALLOWED = 16 x 16 / 4 x 4
  TU SIZE FOR Y   = 8 x 8,
  TU SIZE FOR U,V = 8 x 8
  6-BIT CBP USED FOR SIGNALING NON-ZERO DCT BLOCKS

CU → TU PARTITIONING

CASE 1: PU SIZE = 16 x 16, MAXIMUM/MINIMUM TU SIZE ALLOWED = 8 x 8 / 4 x 4
TU SIZE FOR Y   = 8 x 8,
TU SIZE FOR U,V = 8 x 8
1-BIT CBF Y, U, V USED FOR SIGNALING NON-ZERO DCT BLOCKS

CASE 2: PU SIZE ≠ 16 x 16, MAXIMUM/MINIMUM TU SIZE ALLOWED = 8 x 8 / 4 x 4
TU SIZE FOR Y   = 8 x 8,
TU SIZE FOR U,V = 8 x 8
6-BIT CBP USED FOR SIGNALING NON-ZERO DCT BLOCKS

CU → TU PARTITIONING

CASE 1: PU SIZE = 16 x 16, MAXIMUM/MINIMUM TU SIZE ALLOWED = 4 x 4 / 4 x 4
   TU SIZE FOR Y    = 4 x 4,
   TU SIZE FOR U,V = 4 x 4
   1-BIT CBF Y, U, V USED FOR SIGNALING NON-ZERO DCT BLOCKS

CASE 2: PU SIZE ≠ 16 x 16, MAXIMUM/MINIMUM TU SIZE ALLOWED = 4 x 4 / 4 x 4
   TU SIZE FOR Y    = 4 x 4,
   TU SIZE FOR U,V = 4 x 4
   6-BIT CBP USED FOR SIGNALING NON-ZERO DCT BLOCKS

METHOD AND APPARATUS FOR A LOW COMPLEXITY TRANSFORM UNIT PARTITIONING STRUCTURE FOR HEVC

CROSS-REFERENCE TO RELATED APPLICATIONS

This application is a Continuation of U.S. patent application Ser. No. 13/350,069, currently pending, which claims the benefit of U.S. Provisional Patent Application Ser. No. 61/432,425, filed Jan. 13, 2010, which is incorporated herein by reference.

BACKGROUND OF THE INVENTION

Field of the Invention

Embodiments of the present invention generally relate to a method and apparatus for a low complexity transform unit partitioning structure for High Efficiency Video Coding (HEVC).

Description of the Related Art

A high efficiency video coding ("HEVC") standard has been discussed by a joint collaborative team on video coding ("JCT-VC") of the International Organization for Standardization ("ISO"), International Electrotechnical Commission ("IEC"), Moving Picture Experts Group ("MPEG"), and International Telecommunication Union's Telecommunication Standardization Sector ("ITU-T").

For the HEVC standard, one goal is efficiency improvement over the MPEG-4 advanced video coding ("AVC") H.264 High Profile standard. In one example, a picture is divided into un-overlapped LCUs (Largest Coding Unit) of equal size. A LCU contains a number of CUs (Coding Unit) of variable sizes. A CU is further decomposed into PUs (Prediction Unit) for motion compensated prediction or intra prediction, and TUs (Tranform Unit) for transformation of prediction residual. How a CU is decomposed into TUs (TU partitioning structure) can be signaled with a residual quadtree (RQT). The RQT-based TU partitioning structure is independent of PU partitioning structure. The determination of RQT is a complex process because in requires rate-distoration optimization to obtain high coding efficiency.

Therefore, there is a need for a method and/or apparatus for a low-complexity transform unit partitioning structure for the HEVC.

SUMMARY OF THE INVENTION

Embodiments of the present invention relate to a method and apparatus for a low complexity transform unit partitioning structure for High Efficiency Video Coding (HEVC). The method includes determining prediction unit size of a coding unit, and setting the size of transform unit size of Y, U and V according to the prediction unit size of the coding unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figures 1, 2:
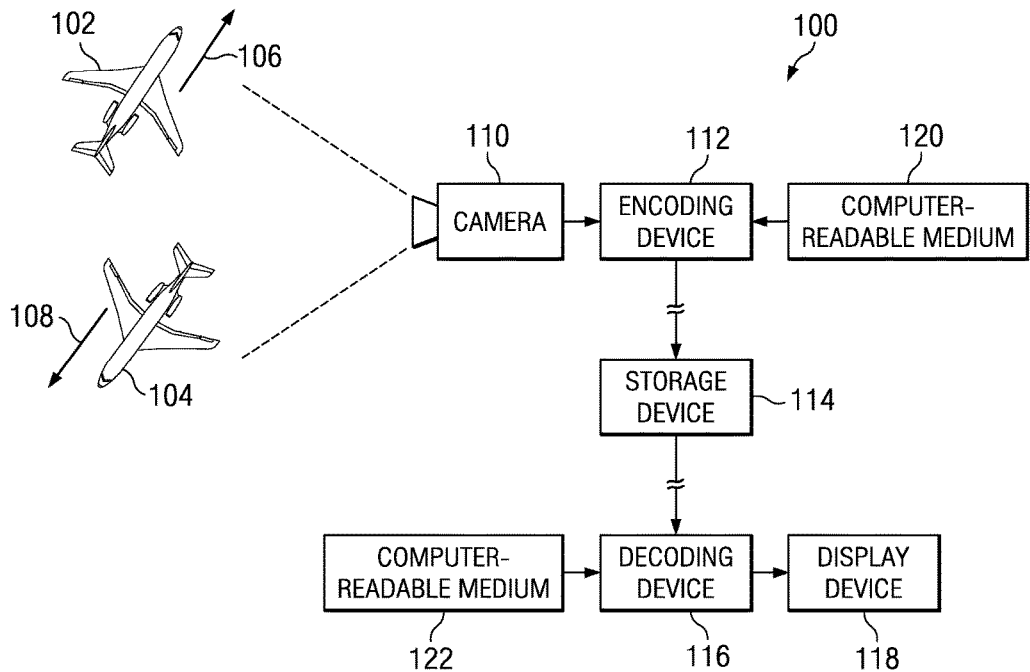
FIG. 1 is an embodiment of a block diagram of an information handling system for encoding and decoding pictures.
FIG. 2 is an embodiment of a conceptual illustration of largest coding units ("LCUs") within a digitized picture that is processed by the system of FIG. 1.

FIG. 1 is a block diagram of an information handling system, indicated generally at 100, for encoding and decoding pictures. In the example of FIG. 1, physical objects 102 and 104 are capable of moving in various directions (e.g., as indicated by arrows 106 and 108, respectively). During a period of time, a video camera 110: (a) views such objects and their surrounding foregrounds and backgrounds; (b) digitizes pictures of such views; and (c) outputs a video sequence of such digitized (or "digital") pictures to an encoding device 112. The encoding device 112: (a) receives the video sequence of such digitized pictures from the video camera 110; (b) in response thereto, encodes the video sequence of such digitized pictures into a binary logic bit stream; and (c) outputs such bit stream to a storage device 114, which receives and stores such bit stream. In one embodiment, the encoding device 112 is operable to perform such encoding in accordance with an HEVC standard (e.g., H.265 standard).

A decoding device 116: (a) reads such bit stream from the storage device 114; (b) in response thereto, decodes such bit stream into the video sequence of such digitized pictures; and (c) outputs the video sequence of such digitized pictures to a display device 118. The display device 118: (a) receives the video sequence of such digitized pictures from the decoding device 116; and (b) in response thereto, displays the video sequence of visual images (e.g., visual images of the objects 102 and 104 and their surrounding foregrounds and backgrounds), which are viewable by a human user. In one embodiment, the decoding device 116 is operable to perform such decoding in accordance with the HEVC standard.

In an alternative embodiment: (a) the encoding device 112 outputs such bit stream directly to the decoding device 116 via a communication channel (e.g., Ethernet, Internet, or wireless communication channel); and (b) accordingly, the decoding device 116 receives such bit stream directly from the encoding device 112. In such alternative embodiment, the storage device 114 either: (a) concurrently receives and stores such bit stream from the encoding device 112; or (b) is absent from the system 100.

The encoding device 112 performs its operations in response to instructions of a computer-readable program that is stored on a computer-readable medium 120 (e.g., hard disk drive, flash memory card, or other nonvolatile storage device). Similarly, the decoding device 116 performs its operations in response to instructions of a computer-readable program that is stored on a computer-readable medium 122. The system 100 is formed by electronic circuitry components for performing the system 100 operations.

FIG. 2 is a conceptual illustration of largest coding units ("LCUs") within a digitized picture that is processed by the system 100. In the illustrative embodiment, each LCU is a square array having a particular size (e.g., 64×64 pixels, which equals 4,096 pixels per LCU). In FIG. 2, the LCUs are numbered LCU ab, where: (a) a is an LCU row number that ranges from 0 through N; (b) N is a total number of LCU rows within the digitized picture; (c) b is an LCU column number that ranges from 0 through M; and (d) M is a total number of LCU columns within the digitized picture. For clarity, although N>2 and M>2, FIG. 2 shows only nine of the LCUs, where a ranges from 0 through 2, and where b ranges from 0 through 2.

Figure 3:
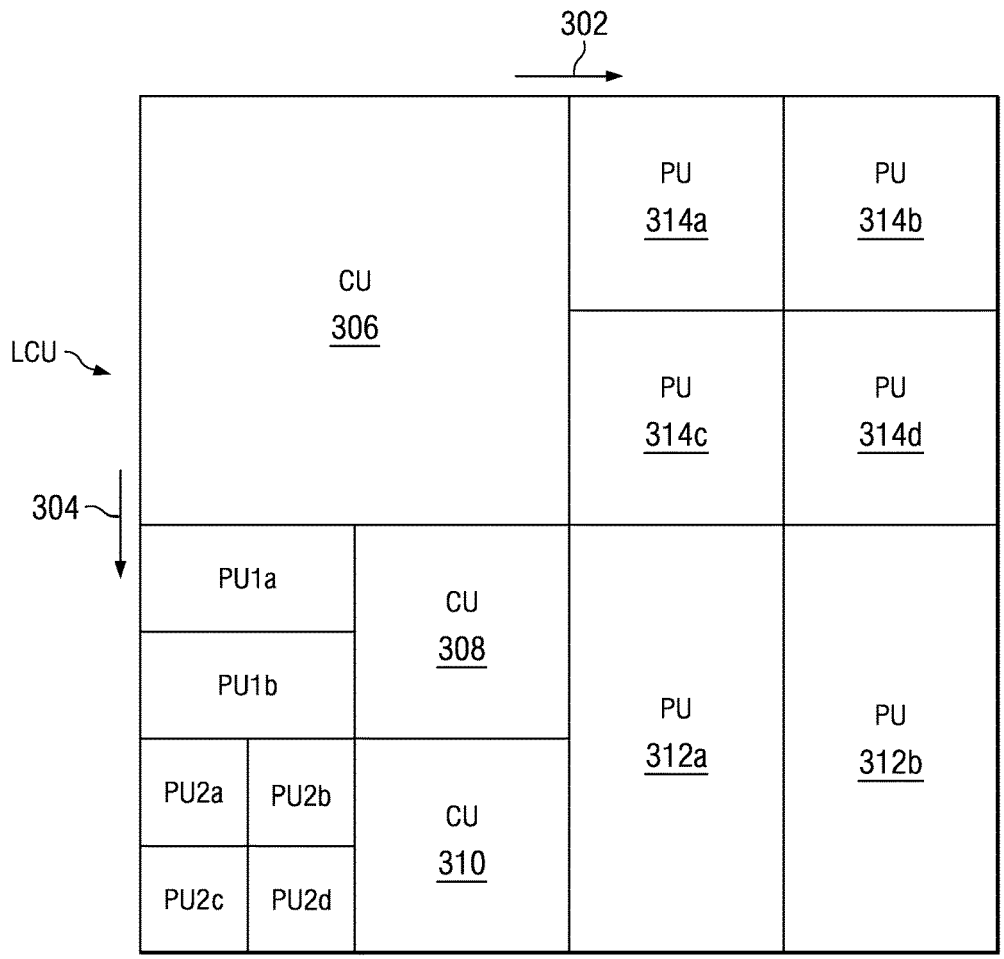
FIG. 3 is an embodiment of a conceptual illustration of coding units ("CUs") and prediction units ("PUs") within an example LCU of FIG. 2.

FIG. 3 is a conceptual illustration of coding units ("CUs") and prediction units ("PUs") within an example LCU of FIG. 2. The encoding device 112 encodes a digitized picture into a binary logic bit stream by encoding pixels of such digitized picture in a raster scan order (e.g., left-to-right and top-to-bottom as indicated by raster scanning arrows 302 and 304, respectively). Similarly, the decoding device 116 decodes such bit stream into such digitized picture by decoding pixels of such digitized picture in the same raster scan order.

In FIG. 3: (a) a CU 306 includes a single PU, so that the CU 306 is coextensive with its single PU, the PU size is 2N×2N; (b) a CU 308 includes a single PU, so that the CU 308 is coextensive with its single PU, the PU size is 2N×2N; and (c) a CU 310 includes a single PU, so that the CU 310 is coextensive with its single PU, the PU size is 2N×2N. Also, in FIG. 3: (a) another CU includes two PUs 312a and 312b; and (b) yet another CU includes two PUs that are labeled PU1a and PU1b. Moreover, in FIG. 3: (a) another CU includes four PUs 314a, 314b, 314c and 314d; and (b) yet another CU includes four PUs that are labeled PU2a, PU2b, PU2c and PU2d. The PU size is not 2N×2N in those cases.

Accordingly, as shown in FIG. 3, the example LCU includes CUs and PUs that have a variety of sizes and shapes. Those sizes and shapes, the number of CUs, and the number of Pus are potentially different on an LCU-by-LCU basis. In that manner, each LCU includes its own respective combination of CUs and PUs that have a variety of sizes and shapes. In the illustrative embodiment, the minimum PU size is 4×8 (and/or 8×4) pixels, the maximum PU size is 64×64 pixels, and the maximum CU size is 64×64 pixels. In one embodiment, the minimum CU size is 8×8 pixels. In another embodiment, the minimum CU size is 16×16 pixels.

Figure 4:
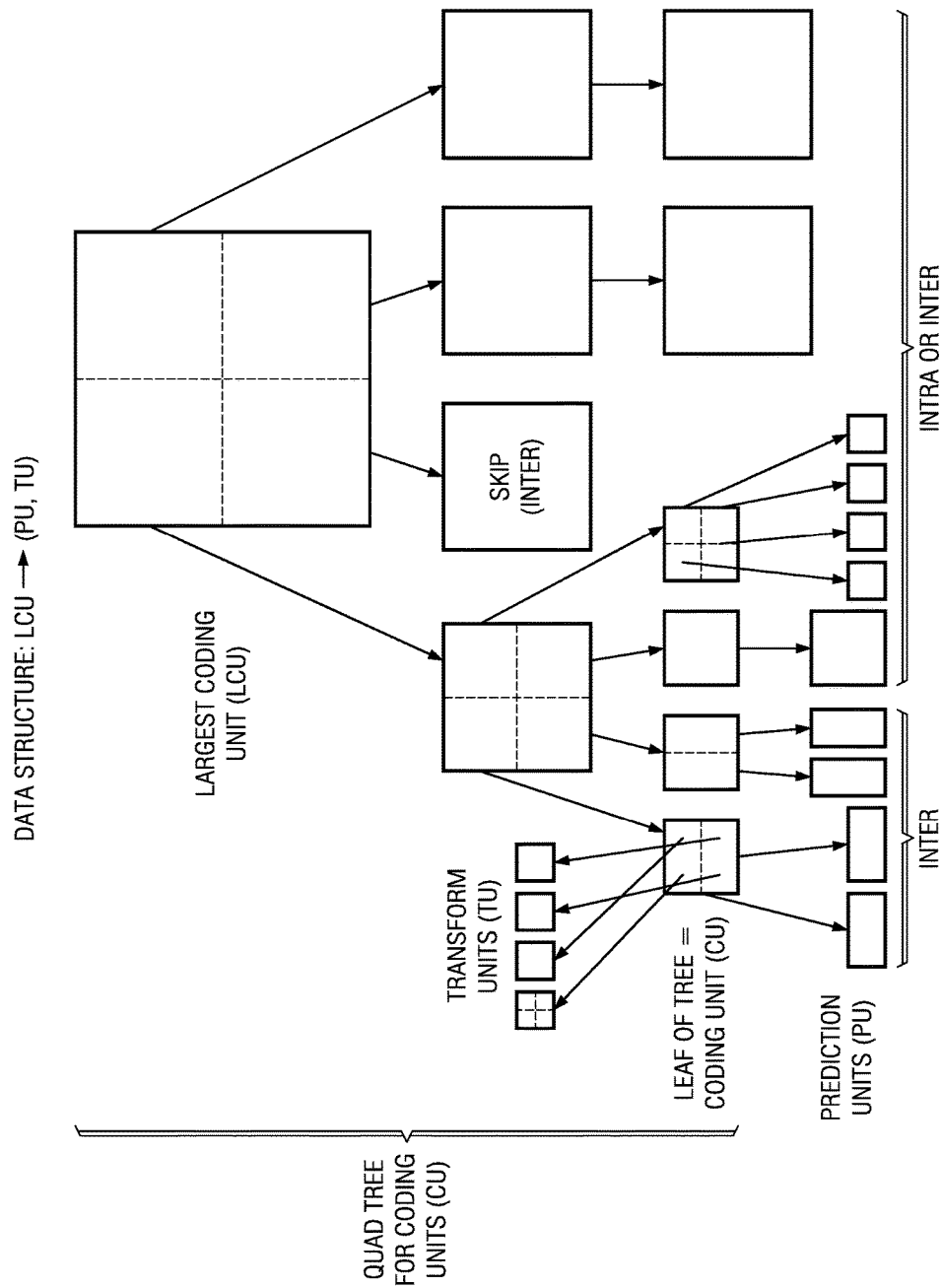
FIG. 4 is an embodiment depicting the relationship between LCUs, CU, PUs and TUs (Transform Unit)
Figure 6:
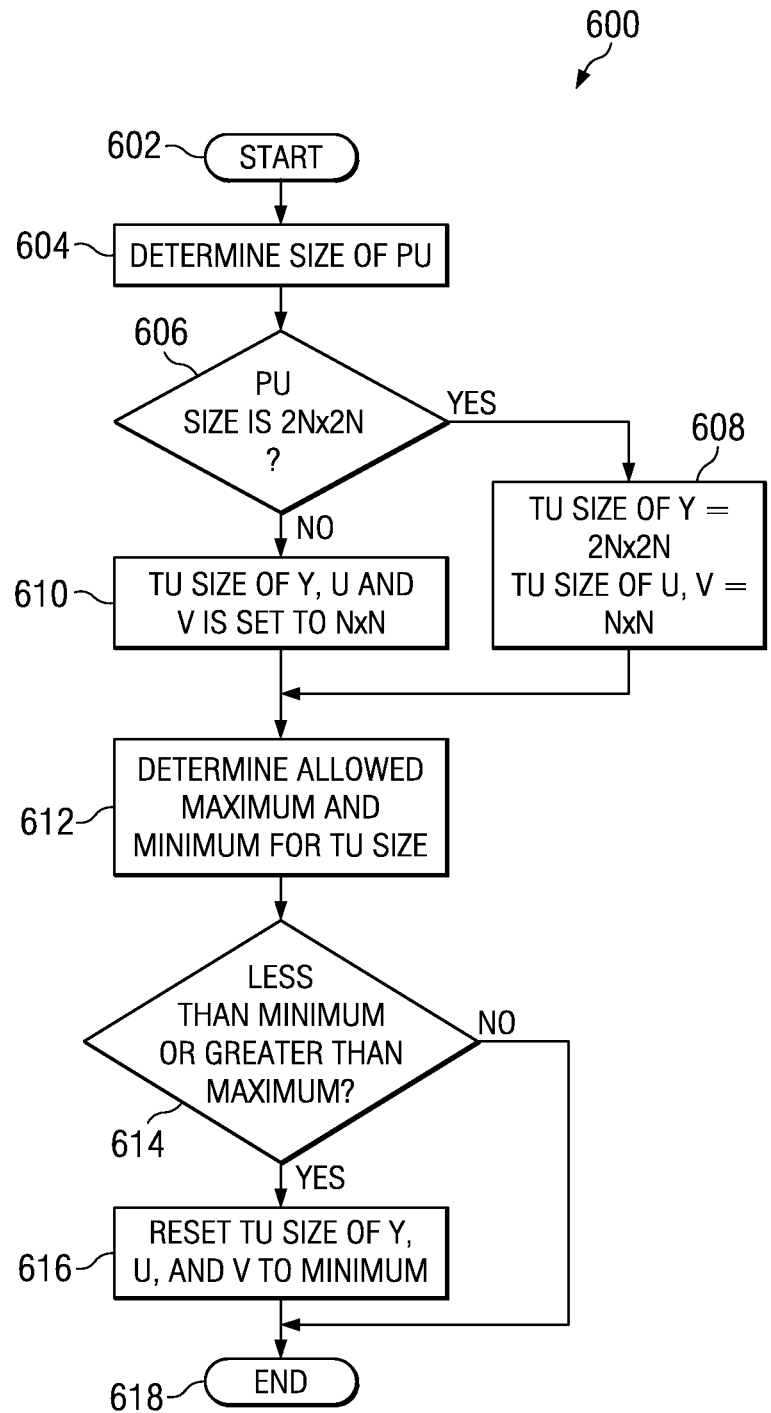
FIG. 6 is an embodiment of a method for determining TU (transform unit) based on PU size.

FIG. 4 is an embodiment depicting the relationship between LCUs, CUs, PUs (Prediction Unit) and TUs (Transform Unit). As described herein, in the HEVC a frame is divided into no-overlapped LCUs. An LCU can be split into number of CUs, and a CU is decomposed into PUs for motion compensated inter prediction or intra prediction and TUs for transformation. In one embodiment, the maximum LCU size is 64×64 (i.e. 64×64 samples from luminance component Y, and 32×32 samples each from chrominance components U and V for chroma format 4:2:0), the minimum LCU size is 16×16.

Figure 5:
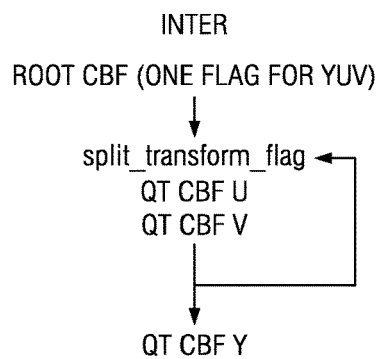
FIG. 5 is an embodiment of TU (transform unit) partitioning tree.

FIG. 5 is an embodiment of TU (transform unit) partitioning tree. The TU partitioning tree is namely residual quad tree (RQT), which is currently adopted in the HEVC test model. For an Intra-coded CU, the RQT consists of recursive split transform flags and leaf QT CBF (Coded Block Flags). In one embodiment, the TU size cannot be larger than PU size and cannot go across PU boundaries. For an inter-coded CU, the RQT is made up of a root CBPF flag, recursive split transform flags and chroma CBF flags followed by the leaf CBF flags. In one embodiment, the TU tree is totally independent of the PU partitioning tree. Furthermore, the TU size may be larger than the PU size and can go across PU boundaries.

It has been indentified that the CU to TU partitioning with RQT method is very challenging for the real-time encoder implementation. In the CU to PU partitioning, using simplified cost metric maybe done, for example, by using SAD (sum of absolute block difference) plus motion vector cost instead of brute force rate-distortion optimization. Whereas, for the CU to TU partitioning, it is very difficult to determine the TU tree without doing actual transform, quantization and entropy coding. Simulation data also shows that the RQT quality gain is marginal (i.e. less than 1%) even if the brute-force rate-distortion optimization is employed in the CU to TU partitioning decision process. In addition, the RQT also imposes burden on the decoder side because a large number of CBF and transform splitting flags are transmitted.

In one embodiment, the design is simplified by utilizing an implicit TU partitioning structure for the HEVC. FIG. 5 is an embodiment for determining a TU partitioning structure based on the parameters, such as, CU size, PU prediction mode, Maximum TU size allowed for the coding, and Minimum TU size allowed for the coding.

In one embodiment, the CU size be 2N×2N, maximum TU size allowed be maxTUsize×maxTUsize, and minimum TU size allowed be minTUsize×minTUsize. If PU size is 2N×2N. The TU size for Y, U, V are determined by:

TU size for $Y=NY \times NY$, $NY=TUsize(2N, maxTUsize, minTUsize)$

TU size for $U, V=NC \times NC$, $NC=TUsize(N, maxTUsize, minTUsize)$

Furthermore, CBF Y, CBF U and CBF V bits are used for signaling whether there are non-zero DCT-coefficients in Y (block 0), U (block 1), V (block 2) part of the CU. If PU size is not 2N×2N, the TU size for Y, U, V are determined by TU size for $Y=NY \times NY$, $NY=TUsize(N, maxTUsize, minTUsize)$ TU size for $U, V=NC \times NC$, $NC=TUsize(N, maxTUsize, minTUsize)$ A 6-bit CBP may be used for signaling whether there are non-zero DCT-coefficients in Y blocks (block 0, 1, 2, 3), U (block 4), V (block 5) of the CU. (CBP=coded Block Pattern), where $TUSize(s, maxTUsize, minTUsize) = max(minTUsize, min(maxTUsize, s))$ where, the 'max' and 'min' functions set the maximum size and minimum size, respectively, of TU.

Hence, the PU size may be used to determine the TU (Y, U and V). As a result, a dependency is created between the PU partitioning and TU partitioning of a CU that simplifies the complexity of TU partitioning structure for the HEVC and, thus, simplifies both the HEVC encoder and decoder design.

FIG. 7 is an embodiment of a method 600 for determining TU based on PU size. The method starts at step 602 and proceeds to step 604. At step 604, the method 600 determines the size of the PU. At step 606, if the size of the PU is 2N×2N, where N is a fixed block size, then, at step 608, TU size of Y is set t o be 2N×2N and TU size of U and V is set to be N×N. If, however, the size of PU is not 2N×2N, i.e. N×2N, 2N×N, N×N or other non-square sizes, then, at step 610 the TU size of Y, U and V is set to N×N.

From step 608 and step 610, the method 600 proceeds to step 612. At step 612, the method 600 determines the allowed maximum and minimum. At step 614, if the TU size set is not within the minimum and maximum allowed, then at step 616, the TU size is reset to meet the minimum or maximum allowed for TU size; otherwise, the method 600 proceeds to step 618. From step 616, the method 600 proceeds to step 618. The method 600 ends at step 618.

Figure 7A:
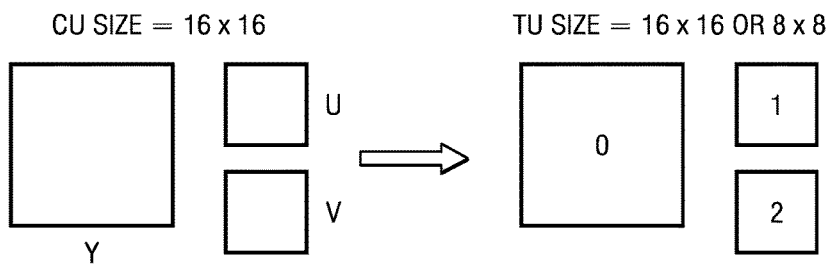
FIG. 7A, FIG. 7B and FIG. 7C are embodiments of TU (transform unit) partitioning structure.
Figure 7A:
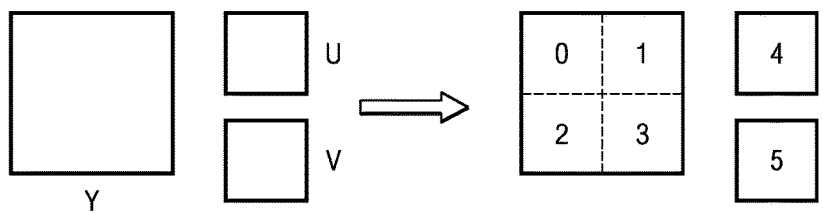
Figure 7B:
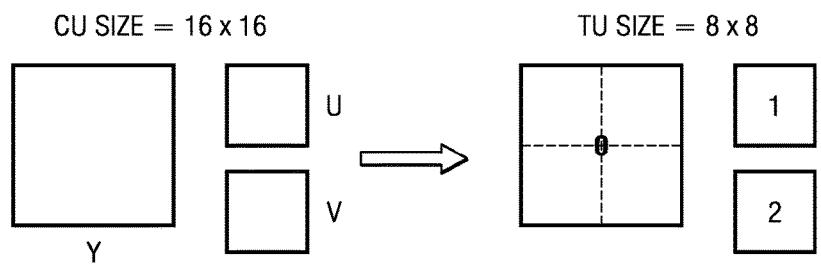
Figure 7B:
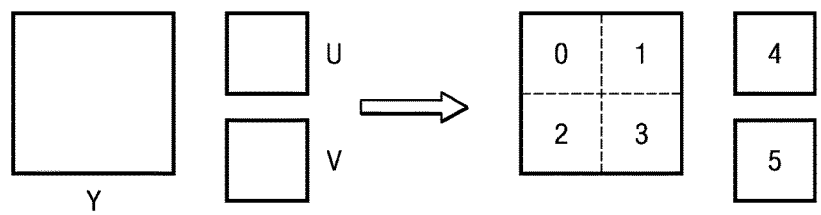
Figure 7C:
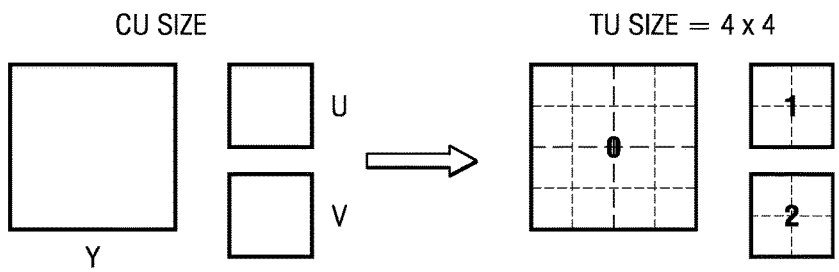
Figure 7C:
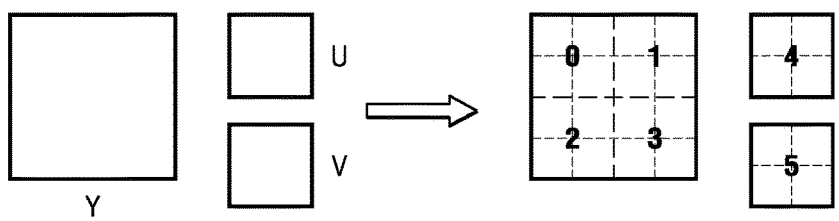

For more clarification, FIG. 7A, FIG. 7B and FIG. 7C are embodiments of the TU (transform unit) partitioning structure. In FIG. 7A, top example, the CU and PU size is 16×16 (2N×2N). In such a case, the TU size of Y is set to 16×16, whereas, the TU sizes of U and V are set to 8×8. On the other hand, in FIG. 7A, lower example, the CU size is 16×16 (2N×2N) and PU size is 8×16 or 16×8 (not 2N×2N). In such a case, the TU sizes of Y, U and V are set to 8×8.

In one embodiment, a block in CU may be forced to use smaller TU size due to the maximum and minimum TU size allowed. Thus, number of TUs is split further, whereas, the CBF or CBP definition remains unchanged. For example, FIG. 7B and FIG. 7C the TU size is restricted by the allowable maximum and minimum, In FIG. 7B, the PU size=16×16, TU size of Y is forced to use 4 8×8 because maximum TU size allowed is 8×8 and the 1-bit CBF Y still cover the entire 16×16 block region. In such a case, the CBF is set to 1 if there is at least one 8×8 TU in Y has non-zero coefficients. Therefore, it is set to zero if all the four 8×8 TUs have all zero-coefficients. In FIG. 7C, the maximum allowed is 4×4, thus, the TU size is limited to be 4 4×4 TU blocks.

Thus, by employing an implicit structure and not requiring separate rate-distortion optimization (as in RQT), the proposed solution reduces the complexity for determining the CU to TU partitioning and reducing the number of CBF and transform splitting flags transmitted. Thus, the complexity is reduced for both the encoder and for the decoder.

While the foregoing is directed to embodiments of the present invention, other and further embodiments of the invention may be devised without departing from the basic scope thereof, and the scope thereof is determined by the claims that follow.

What is claimed is:

1. A method comprising:
   determining, with a coding device, a prediction unit size of a coding unit; and
   setting, with the coding device, transform unit sizes for a luminance component (Y) and chrominance components (U and V) based on whether the prediction unit size of the coding unit is 2N×2N.

2. A device comprising one or more processors configured to:
   determine a prediction unit size of a coding unit; and
   set transform unit sizes for a luminance component (Y) and chrominance components (U and V) based on whether the prediction unit size of the coding unit is 2N×2N.

3. A non-transitory computer readable medium comprising instructions that, when executed by a processor, cause the processor to:
   determine a prediction unit size of a coding unit; and
   set transform unit sizes for a luminance component (Y) and chrominance components (U and V) based on whether the prediction unit size of the coding unit is 2N×2N.

* * * * *